April 3, 1962 N. R. RICHMOND 3,027,986
CLUTCH MECHANISM FOR A HELICOPTER
Filed Sept. 9, 1953 4 Sheets-Sheet 1

INVENTOR.
NELSON R. RICHMOND
BY
S. Jay Teller
ATTORNEY

April 3, 1962  N. R. RICHMOND  3,027,986
CLUTCH MECHANISM FOR A HELICOPTER
Filed Sept. 9, 1953  4 Sheets-Sheet 2

INVENTOR.
NELSON R. RICHMOND
BY S. Jay Teller
ATTORNEY

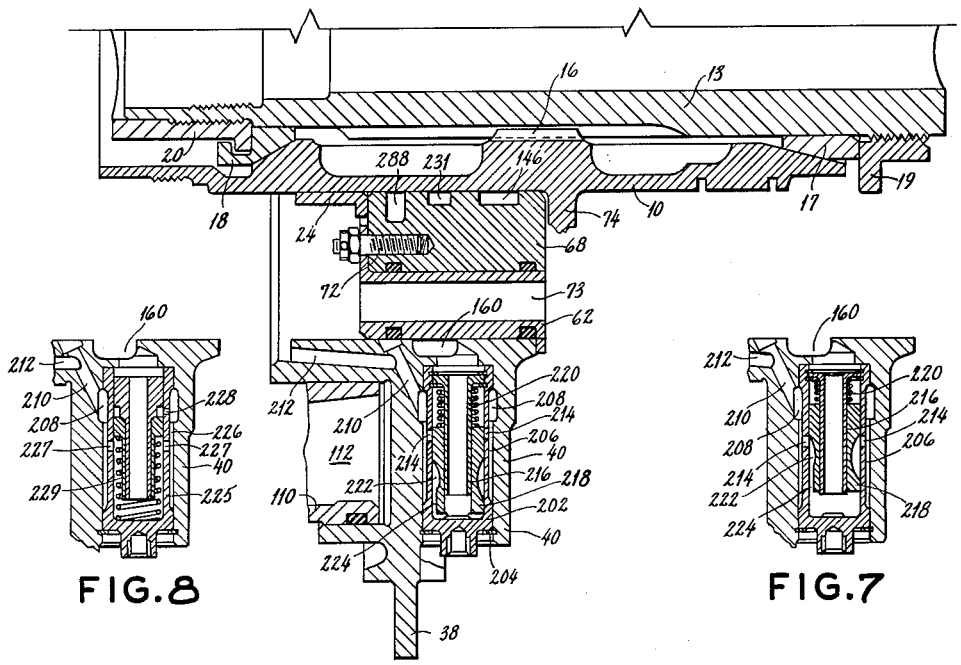
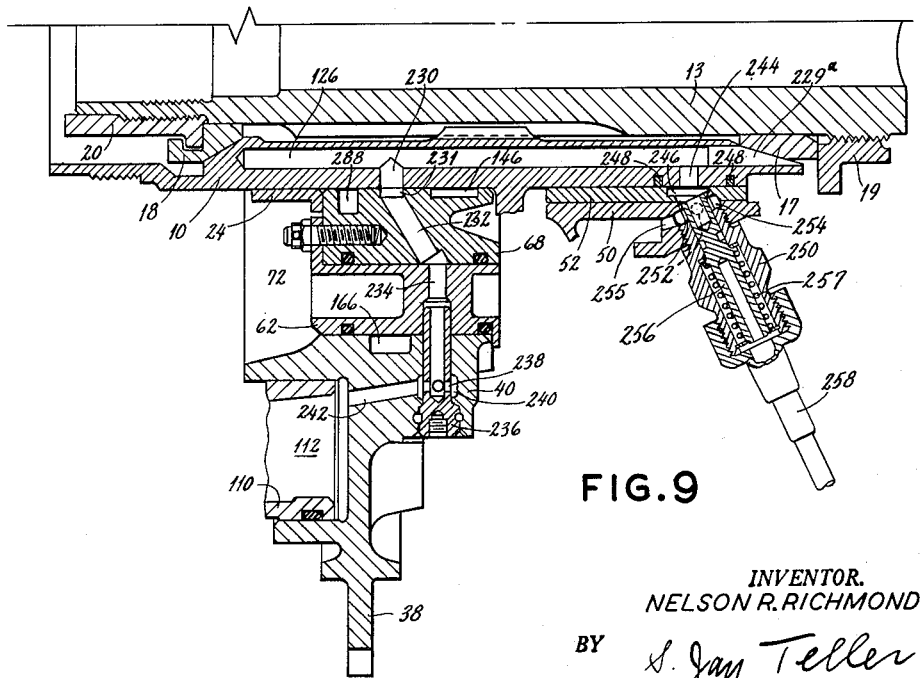

April 3, 1962   N. R. RICHMOND   3,027,986
CLUTCH MECHANISM FOR A HELICOPTER
Filed Sept. 9, 1953   4 Sheets-Sheet 4

INVENTOR.
NELSON R. RICHMOND
BY *S. Jay Teller*
ATTORNEY

United States Patent Office 3,027,986
Patented Apr. 3, 1962

3,027,986
CLUTCH MECHANISM FOR A HELICOPTER
Nelson R. Richmond, Thompsonville, Conn., assignor to The Kaman Aircraft Corporation, Windsor Locks, Conn., a corporation of Connecticut
Filed Sept. 9, 1953, Ser. No. 379,108
41 Claims. (Cl. 192—85)

The present invention relates to a clutch mechanism for a helicopter. The helicopter in its entirety may be widely varied but the invention is applicable to a helicopter such as shown in the application of Charles H. Kaman and Martin L. Stevens, Serial No. 115,749 filed September 14, 1949, now Patent No. 2,695,674 dated November 30, 1954. Reference is made to the said patent as exemplifying any helicopter features not herein disclosed.

In a helicopter having a clutch mechanism embodying the invention, the said clutch mechanism is interposed between the motor of the helicopter and the rotor or rotors thereof. The motor is normally operable and the clutch mechanism includes a normally rotating driving member directly connected with the motor. The rotor is normally rotatable in a selected direction by power transmitted thereto and it is capable of autorotation in the same direction by aerodynamic forces. The clutch mechanism includes a member connected with the rotor for rotation in synchronism therewith under all conditions. The clutch mechanism also includes a rotatable intermediate member together with means for transmitting power thereto from the driving member. The clutch mechanism further includes a power transmitting means or clutch interposed between the intermediate member and the rotor connected or driven member, the last said power transmitting means or clutch being variable in effectiveness and serving to establish or break a power connection between the intermediate member and the rotor connected or driven member.

During power-on flight power is transmitted from the motor to the rotor through the said driving member, through the first said transmitting means, through the said intermediate member, through the second said power transmitting means or clutch and through the said rotor connected or driven member, the effectiveness of the second said power transmitting means or clutch being dependent upon the torque in the first said power transmitting means.

Upon failure of the motor or upon substantial reduction in the speed thereof, the rotor rotates aerodynamically and serves to rotate the said rotor connected member. The characteristics of the clutch mechanism are such that rotation of the last said member at a speed greater than that corresponding to the motor speed causes the interruption of the power connection through the second said power transmitting means or clutch, thus leaving the rotor free for autorotation entirely independently of the motor and of all parts directly associated therewith.

The general object of the invention is to provide a clutch mechanism adapted for use in a helicopter and having the characteristics above set forth and having various additional advantageous features of operation and construction. Among these features are: a hydraulic system for controlling the second power transmitting means or clutch; pumps dependent upon rotation of the driving and intermediate members for maintaining pressure in the hydraulic system; centrifugally operated means for regulating or controlling the pressure in the hydraulic system; manually controlled means for causing the clutch mechanism to operate without the transmission of power so that the motor may be operated for starting and for warm-up purposes; means dependent upon pressure in the hydraulic system for indicating the torque transmitted by the clutch mechanism; means for utilizing the hydraulic system for the lubrication of relatively movable parts; and auxiliary means dependent upon relative rotation of the intermediate and driven members for operating the pumps to insure lubrication during autorotation.

In the drawings I have shown in detail one embodiment of the invention together with certain alternative details, but it will be understood that various changes may be made from the constructions shown, and that the drawings are not to be construed as defining or limiting the scope of the invention, the claims forming a part of this specification being relied upon for that purpose.

Of the drawings:

FIG. 6 is a fragmentary longitudinal sectional view taken along the line 6—6 of FIG. 5, this view omitting various parts as to which the showing would be substantially the same as that in FIG. 1.

FIG. 7 is a fragmentary view similar to FIG. 6, but showing some of the parts in different positions.

FIG. 8 is a fragmentary sectional view similar to FIG. 7, but showing an alternative valve construction.

FIG. 9 is a fragmentary longitudinal sectional view taken along the lines 9—9 of FIG. 5, this view omitting various parts as to which the showing would be substantially the same as that in FIG. 1.

Figure 1:
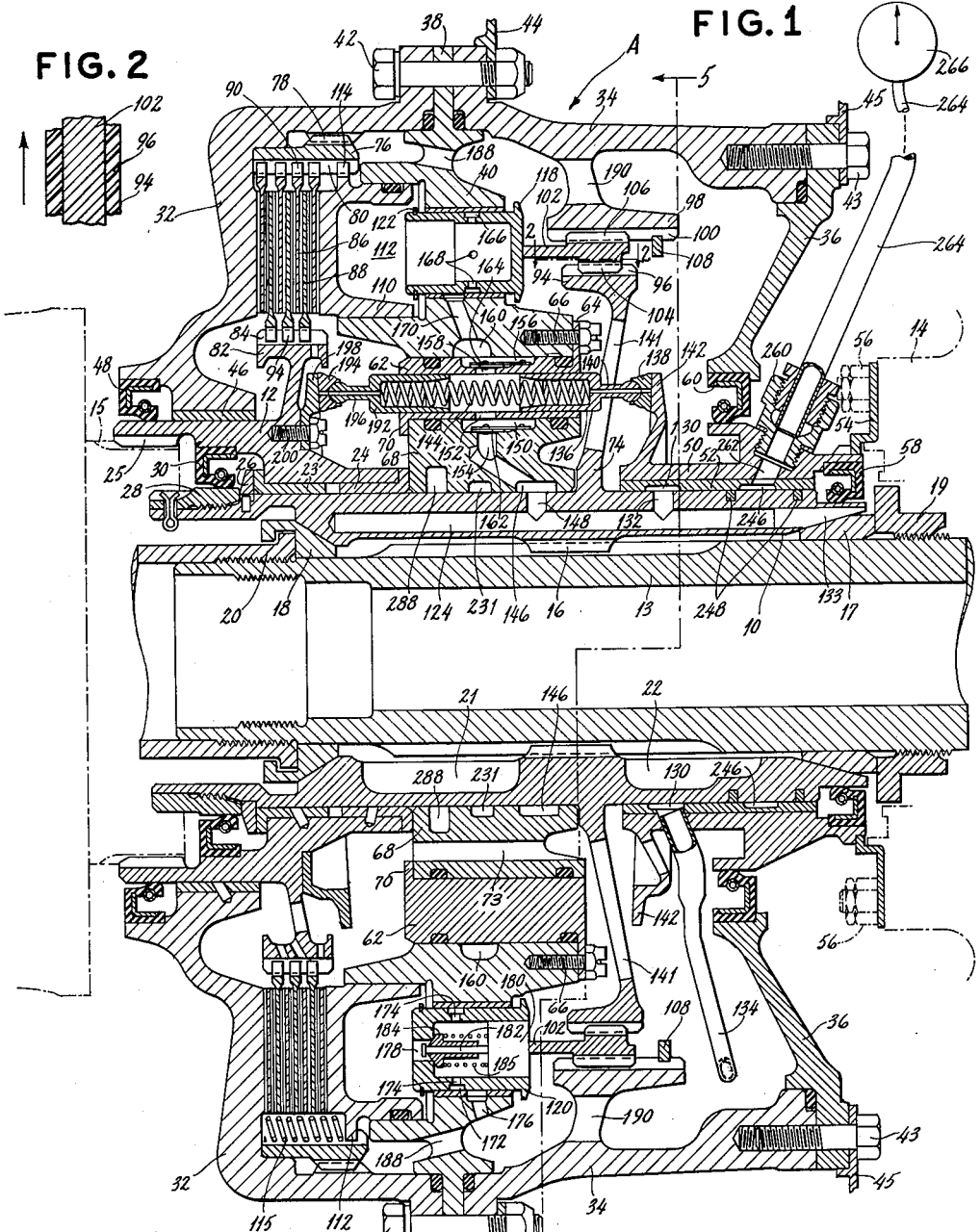
FIG. 1 is a vertical longitudinal sectional view showing chiefly the clutch mechanism of a helicopter embodying the invention, this view being taken along the line 1—1 of FIG. 5.
Figure 3:
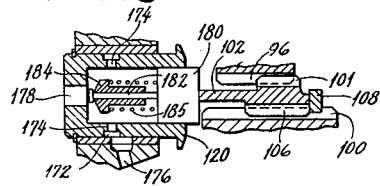
FIG. 3 is a fragmentary view similar to a portion of FIG. 1, but showing the exhaust valve parts in different relative positions.
Figure 4:
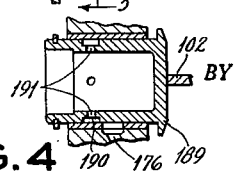
FIG. 4 is a fragmentary view similar to a portion of FIG. 1, but showing an alternative exhaust valve.
Figure 5:
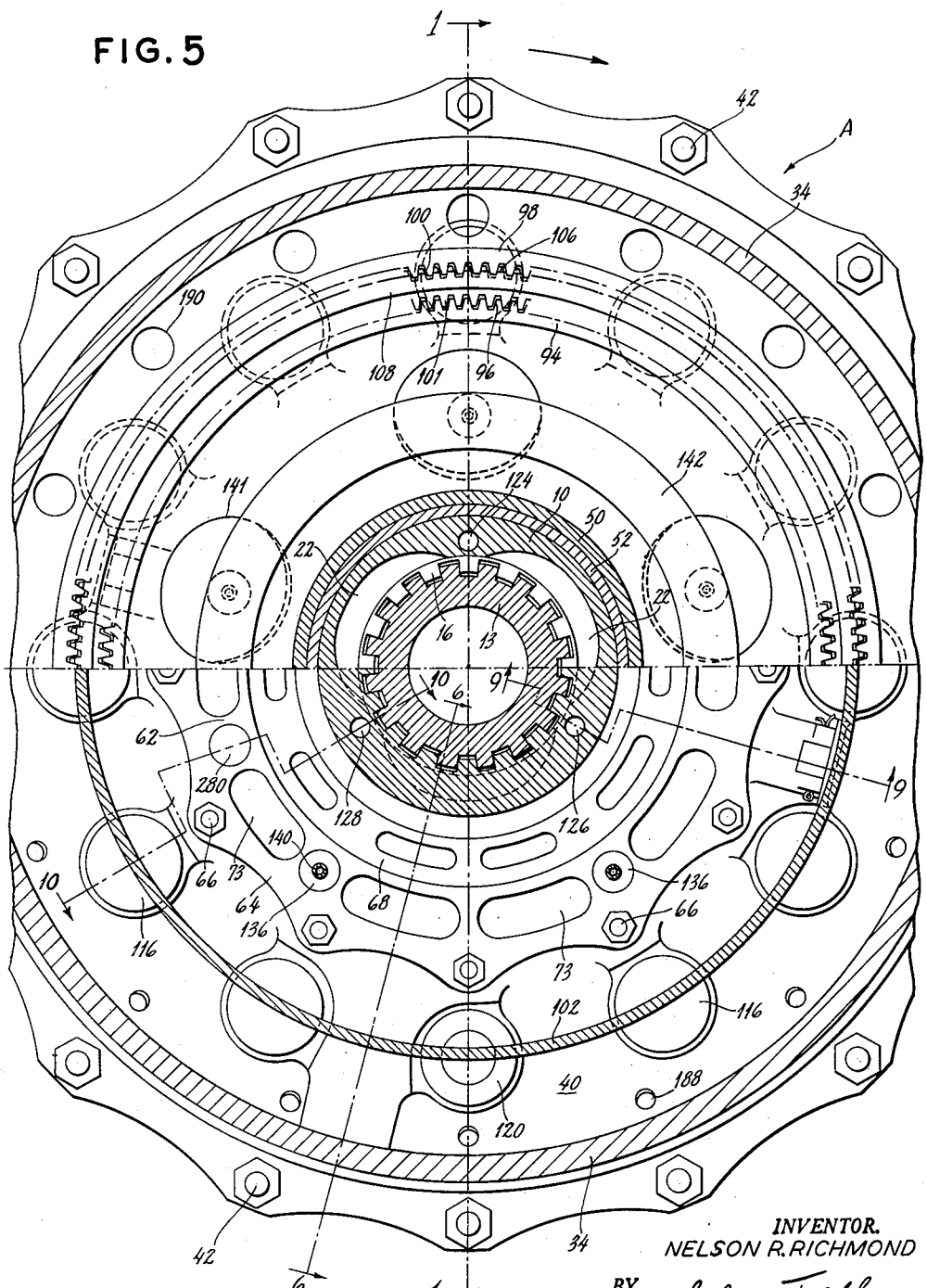
FIG. 5 is a vertical transverse sectional view taken along the line 5—5 of FIG. 1.

FIGS. 1 to 10 of the drawings show the clutch mechanism in detail, this being generally indicated at A in FIGS. 1 and 5. FIG. 1 shows only a portion of the motor and only a portion of the power connection from the clutch mechanism A to the rotor. FIG. 11 schematically shows a rotor and the power connections including the clutch mechanism A between the motor and the rotor. Most of the parts of the clutch mechanism A, as shown in FIGS. 1 to 10, are rotatable about a central longitudinal axis and they therefore assume various rotative positions. For clarity of illustration one rotative position has been arbitrarily selected for illustration, as shown particularly in FIGS. 1 and 5.

*Driving and Driven Members of Clutch Mechanism*

Referring to the drawings and more particularly to FIGS. 1 and 5, the clutch mechanism A comprises a rotatable driving or power member 10, and a rotatable power member 12 which is normally the driven member and which is preferably rotatable about the same axis as the driving member. When the clutch mechanism is used in or as a part of a helicopter, the driving member 10 is splined or otherwise connected with the shaft 13 of the main helicopter motor 14, the housing of the motor being shown. The driven member 12 is splined or otherwise connected with a rotatable member 15 which is operatively connected by suitable power transmitting means with the rotor or rotors of the helicopter. The connection between the member 15 and the rotor or rotors of the helicopter is such that the said member and the said rotor or rotors rotate in synchronism under all conditions.

As shown, the driving member 10 is a sleeve surrounding the shaft 13 and connected for rotation in unison therewith by suitable means such as internal integral teeth at 16 fitting corresponding splines in the shaft. The sleeve 10 is centered with respect to the shaft 13 by beveled rings 17 and 18 which are held in position by rings 19 and 20 having threaded engagement with the shaft. For reduction of weight the member 10 has annular recesses 21 and 22 at opposite ends of the teeth 16.

The driven member 12 is supported on the driving member or sleeve 10 for rotation relative thereto, interposed bearing bushings 23 and 24 being provided which bushings are preferably connected for rotation with the said member 12. The said bushings have a small annular space between them. The member 12 has internal integral teeth at 25 fitting corresponding splines or grooves in the member 15. A bearing ring 26 abuts against the left end of the left bushing 23 to prevent movement of the said bushing and of the driven member 12 toward the left. The said bearing ring is held in place by a ring 28 having threaded engagement with the left end portion of the driving member 10. An annular sealing element 30 is interposed between the driven member 12 and the ring 28 to prevent the escape of oil.

*Intermediate Member of Clutch Mechanism*

The clutch mechanism includes a rotatable member intermediate the driving and driven members and preferably rotatable about the same axis. The intermediate member preferably includes a rotatable housing which encloses various other parts, the said housing being normally driven by the driving member 10 but not necessarily in exact synchronism therewith. The housing as shown comprises three structurally separate parts or members 32, 34 and 36 which are rigidly connected with each other. Interposed between the members 32 and 34 is an annular flange 38 forming a part of a member 40 hereinafter described in detail. Bolts 42, 42 extend through flanges on the members 32 and 34 and through the said flange 38. The member 36 is directly connected with the member 34 by bolts 43, 43.

Preferably a suitable fan for motor cooling is carried by the rotatable main housing. The details of the fan do not constitute any part of the present invention, but FIG. 1 shows parts of the fan at 44 and 45, these parts being held respectively by the bolts 42, 42 and 43, 43. For clarity the fan parts are omitted from FIG. 5.

The member 32 of the rotatable housing is supported on the driven member 12, the said member 12 and the said housing being independently rotatable. A bearing bushing is interposed between the member 32 and the member 12, which bushing is preferably connected for rotation with the said member 32. An annular sealing element 48 is interposed between the member 32 and the member 12 to prevent the escape of oil.

Surrounding the right end portion of the driving member 10 is a nonrotatable member 50 which is supported by the said driving member. A bearing bushing 52 is interposed between the member 50 and the member 10 which bushing is connected with the member 50 and is nonrotatable. Suitably connected with the member 50 at the right end thereof is an annular flange 54 which flange is connected with the motor housing 16 by means of bolts having nuts 56, 56. An annular sealing element 58 is interposed between the members 50 and 10 and another annular sealing element is interposed between the members 36 and an annular flange on the member 50, both of the said sealing elements serving to prevent the escape of oil.

The said member 40 is connected by means of the flange 38 for rotation in unison with the main clutch housing. The said member constitutes a transverse partition within the housing of the intermediate member, the housing thus having two chambers at opposite sides of the partition. The partition member 40 has a large central opening concentric with the axis of rotation. Fitting within the said opening is a ring 62 having an outwardly extending flange 64 at the right. Bolts 66, 66 extend through the flange 64 and into holes in the member 40, the said ring 62 being thus rigidly connected with the member 40. Fitting within the ring 62 is a second ring 68, this ring at its interior closely fitting the driving member 10. The ring 62 has an inwardly extending flange 70 at its left. Bolts 72 extend through the flange 70 and into holes in the inner ring 68, the said inner ring 68 being thus rigidly connected with the outer ring 62. The bolts 72 are staggered with respect to the bolts 66, 66 and therefore are not seen in FIG. 1, but they are shown in FIGS. 6 and 9. The ring 62 preferably has openings 73 therein to reduce weight and allow circulation of fluid as shown in FIGS. 5, 6 and 9. The ring 68 preferably also has openings 73 therein to reduce weight as shown in FIGS. 1 and 5.

From the foregoing description it will be apparent that the several parts 32, 34, 36, 38, 62 and 68 are all rigidly connected with each other for rotation in unison. These several parts collectively constitute the "intermediate member."

The driving member 10 has a generally radial annular flange 74. The inner ring 68 substantially abuts at the right against the said flange 74, a small clearance being shown in FIG. 1. The said ring abuts at the left against the right bearing bushing 24 on the driven member 12. Substantial endwise movement of the inner ring is thus prevented and the inner ring serves to prevent movement toward the right of the bushing 24 and of the driven member 12. Inasmuch as the said inner ring 68 is held against endwise movement, it is obvious that all of the parts constituting the intermediate member are similarly held.

*Power Transmitting Means or Clutch Between Intermediate and Driven Members*

Means is provided for transmitting power from the intermediate member to the rotor connected member 12, the said means being variable in effectiveness. Preferably the said power transmitting means is a clutch which is shown as being of the multiple plate friction type. The clutch is within the housing of the intermediate member and is in the chamber at the left of the partition member 40 as viewed in FIG. 1.

As shown, there is a ring 76 within the housing member 32 and connected therewith by means of interengaging integral teeth at 78 on the said ring and on the said housing member. The ring 76 has longitudinal internal grooves at 80. The member 12 has an integral annular flange 82 having longitudinal external grooves at 84. Interengaging annular friction clutch plates 86, 86 and 88, 88 are provided. The plates 86, 86 have outwardly projecting teeth 90, 90 which extend into the internal grooves 80 in the ring 76. The plates 88, 88 are alternately disposed with respect to the plates 86, 86 and they have inwardly projecting teeth 92, 92 which extend into the external grooves 84 in the annular flange 82 of the member 12. When lateral pressure is applied to the plates 86, 86 and 88, 88, in the manner hereinafter described, the said plates serve frictionally to transmit power from the main housing or intermediate member to the driven member 12.

The clutch is operable to establish and break a power connection between the intermediate member and the driven or rotor connected member, the power connection being established and broken by the application of pressure or by the release of pressure. The said clutch further constitutes a means variable in effectiveness for transmitting power from the intermediate member to the driven or rotor connected member, the effectiveness of the said means being varied by varying the pressure applied thereto.

Power Transmitting Means Between Driving and Intermediate Members

The means for transmitting power from the driving member to the intermediate member is within the housing of the intermediate member and is in the chamber at the right of the partition member 40 as viewed in FIG. 1.

The aforesaid generally radial annular flange 74 on the driving member 10 has a longitudinal annular flange or portion 94 at its periphery. Formed integrally with the housing member 34 is a longitudinal annular flange or portion 98 which surrounds the annular flange or portion 94. A torque ring 102 is provided a part of which is radially interposed between the said longitudinal annular flanges or portions 94 and 98. A set of radially projecting intermeshing teeth is provided which includes two rows respectively on the outer of the said annular portions and on the said ring 102, and a second set of radially projecting intermeshing teeth is provided which includes two rows respectively on the inner of the said annular portions and on the said ring 102. The intermeshing teeth of the two sets serve to permit the ring to move longitudinally relatively to the said driving and intermediate members and they also serve to transmit torque from the said driving member to the said intermediate member. The teeth of at least one of the said sets are helical with the resultant application to the ring 102 of a force that tends to move the ring longitudinally, the said force being proportionate to the transmitted torque.

Figure 2:
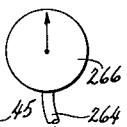
FIG. 2 is a fragmentary sectional view taken along the line 2—2 of FIG. 1.

Preferably and as shown, the inner annular flange or portion 94 has a row of outwardly projecting external teeth 96 having angles of approximately 45° as shown in FIG. 2. The ring 102 has a row of inwardly projecting internal teeth 104 which intermesh with the teeth 96, the said intermeshing teeth 96 and 104 constituting a set. The outer annular flange or portion 98 has a row of inwardly projecting longitudinal teeth 100 and the ring 102 has a row of outwardly projecting external teeth 106 which intermesh with the teeth 100, the said intermeshing teeth 106 and 100 constituting a set.

It will be observed that when the driving member 10 is rotated in the clockwise direction, as indicated in FIG. 5, the intermeshing helical teeth 96 and 104 tend to move the torque ring 102 toward the left, such movement resulting from the fact that the intermediate member is stationary or rotating only slowly. In order for the torque ring to be moved toward the left as stated, there must be some resistance to the rotation of the intermediate member. In the construction as shown, such resistance is provided by the fan which is connected with and driven by the intermediate member.

The said torque ring 102 constitutes a clutch actuating or controlling member as hereinafter explained, and the clutch is engaged when the said ring is moved toward the left. When movement of the ring 102 toward the left is resisted or stopped, the ring is rotated with the flange 94. When this occurs, the intermeshing longitudinal teeth 106 and 100 transmit power from the driving member through the ring 102 to rotate the flange 98 and the entire intermediate member. When the intermediate member is rotated, power is transmitted therefrom through the friction clutch to rotate the driven member 12, the said clutch having been engaged by reason of the movement of the ring 102 toward the left. When the intermediate member is rotated at a speed greater than that of the member 10, the action on the torque rang 102 is reversed and the ring moves toward the right, the clutch being then disengaged. A stop ring 108 is carried by the annular flange 98 for limiting movement of the ring 102 toward the right.

Hydraulic Sytem for Controlling Clutch Between Intermediate and Driven Members A hydraulic system is preferably provided for applying pressure to the said clutch between the intermediate and driven member, and more specifically to the clutch plates 86, 86 and 88, 88, the said hydraulic system being interposed between the clutch and the means for transmitting power from the driving to the intermediate member. A major portion of the said hydraulic system is carried by the partition member 40 and the said system includes a longitudinally movable piston 110 which is preferably annular and fits an annular recess in the member 40. The said annular recess is open at the end adjacent the clutch and the said piston 110 is positioned to engage with the clutch. A normally closed annular chamber 112 is provided which is partly within the piston 110 and partly within the said recess in the member 40. The chamber 112 and other parts of the hydraulic system are normally filled with a suitable hydraulic liquid which is preferably oil. Oil of lubricating quality is preferred, as some of the same oil is used for lubricating purposes as hereinafter explained.

The piston 110 preferably has teeth 114, 114 which enter the grooves 80, 80 in the ring 76, these teeth insuring rotative movement of the piston in exact unison with the housing and with the entire intermediate member. The said teeth do not interfere with longitudinal movement of the piston. Springs 115 are provided for biasing the piston 110 toward the right and away from the clutch plates, these springs being interposed between the said piston and the housing member 32. Only one spring 115 is shown but it will be understood that there is a plurality of springs preferably uniformly spaced circumaxially. For clarity of illustration the spacings between the clutch plates are considerably exaggerated in FIG. 1.

The space within the housing and surrounding the member 10 constitutes a main oil reservoir adapted to contain a supply of the oil or other hydraulic liquid, the oil being retained by the several annular seals that have been described. It will be understood that the space within the housing reservoir is not entirely filled with oil. As hereinafter described in detail, means are provided for normally maintaining a supply of oil in the annular chamber 112 so that the said chamber is completely filled. The oil so supplied is withdrawn from the main reservoir in the housing.

For applying pressure to the oil in the piston chamber 112, there is at least one plunger movable in a plunger chamber which communicates with the piston chamber. Preferably and as shown, there is a plurality of plungers which plungers are longitudinally movable in longitudinal plunger chambers in the member 40, the said plunger chambers communicating with the annular chamber 112. The said plungers at their right ends are engageable by the torque ring 102. The number of plungers may be varied, but as shown in FIG. 5, there are twelve plungers which are equally spaced circumaxially. There are ten similar plungers 116, 116 of which one is shown in section in FIG. 10 and there are two other plungers 118 and 120 as shown in FIG. 1, these last-mentioned plungers also serving respectively as inlet and exhaust valves as hereinafter explained. The plungers or valves 118 and 120 are preferably diametrically opposite each other. Each of the plungers, other than 120, is preferably cup-shaped, being closed at its right end and open at its left end adjacent the annular chamber 112. Each of the plungers has an integral flange 121 at its right end for limiting movement toward the left and each of the said plungers has a snap ring 122 near its left end for limiting movement toward the right.

When the driving member 10 is rotated in the clockwise direction with the intermediate member initially idle or rotating slowly, the torque ring 102 is moved toward the left, as previously stated. When the ring 102 so moves, it engages the plungers 116, 116, 118 and 120 and moves them toward the left to apply pressure to the oil in the annular chamber 112. As the oil pressure in the chamber is increased the annular piston 100 is moved toward the left to apply pressure to the clutch plates 86, 86 and 88, the pressure of the springs 115 being overcome. The oil pressure built up in the chamber resists and limits movement of the plungers toward the left, thus resisting and limiting movement of the torque ring 102 toward the left. As previously explained, the ring 102 when prevented from moving toward the left causes rotation of the flange 98 and of the intermediate member. As the intermediate member rotates, power is transmitted through the clutch plates to the driven member 12 and thence to the rotor or rotors.

By reason of the helical teeth 96 and 104, the longitudinal thrust on the torque ring 102 and therefore the pressure on the clutch plates is exactly proportionate to the torque transmitted from the driving member to the intermediate member and thence through the clutch to the rotor or rotors. If the pitches of the rotor or rotors are increased or decreased to change the resistance to rotor rotation, the required driving torque is correspondingly increased or decreased and the oil pressure and the pressure on the clutch plates is increased or decreased to the same extent.

The rotor connected member 12 may rotate at a speed greater than that of the driving member 10, this ordinarily occurring when the speed of the driving member 10 is reduced but with rotation of the member 12 continued by autorotation of the rotor or rotors. When this occurs the engagement of the clutch plates is momentarily continued to momentarily continue the rotation of the intermediate member, but by reason of the momentary relatively greater speed of the intermediate member the helical teeth 96 and 104 move the torque ring 102 toward the right. This permits the plungers to release the oil pressure in the annular chamber 112, and thereupon the springs 115 move the annular piston 110 toward the right. Pressure is no longer applied to the clutch plates and no power is transmitted. The intermediate member is then no longer driven by the member 12 and it is controlled by the driving member 10 and may rotate slowly or be entirely idle. By reason of the features described, the clutch permits over-running of the rotor or rotors with respect to the driving member and the motor.

*Oil Supply Mechanism for Hydraulic System*

The described hydraulic system includes the annular piston 110 and the annular recess therefor in the member 40 and also includes one or more plungers such as 116, 116, 118 and 120. As has been stated, the space within the main housing constitutes a main oil reservoir. Means is provided for transmitting oil from the said main reservoir to the piston chamber 112. The said means may be widely varied but it includes one or more generally radial holes in or carried by the partition member 40, the hole 170 being an example of such a hole. The said means preferably also includes a stationary intake pipe such as 134 which receives oil from the main reservoir and supplies it to the holes such as 170. The said means for transmitting the oil may be widely varied but one suitable means will be described in detail.

The intermediate member, and more particularly the partition member 40 thereof, has a secondary reservoir 160 which supplies oil to the piston chamber 112 and which receives oil from the intake pipe 134.

The driving member 10 preferably has three equally spaced longitudinal oil holes 124, 126 and 128 as shown in FIG. 5, each of the said oil holes having a separate purpose. Reference will first be made more particularly to the oil hole 124 and to the parts directly associated therewith, the said oil hole being shown in its uppermost position.

Formed in the stationary bushing 52 is an annular oil groove 130. A radial oil hole 132 in the member 10 provides communication from the groove 130 to the oil hole 124, which is closed at its right end by a plug 133. Carried by the member 50 is the before-mentioned oil intake pipe 134, this pipe extending downwardly and communicating at its upper end with the annular oil groove 130. When the clutch mechanism parts are rotating, centrifugal force causes all free oil in the main housing reservoir to move into an annular layer adjacent the housing periphery, the said layer moving in the clockwise direction with the housing. The opening in the lower end of the intake pipe 134 faces in the direction to pick up oil from the moving annular layer. The oil so picked up flows through the said pipe, through the annular oil groove 130 and through the radial oil hole 132 to the longitudinal oil hole 124.

Carried by the ring 62 is at least one pump, and as shown in FIG. 5 there are preferably five pumps equally spaced circumaxially. At each pump the ring 62 is provided with a longitudinal cylindrical hole or chamber. A piston 136 is located in the right end portion of each pump chamber and is longitudinally reciprocable. A shoe 138 is provided for each piston 136 which shoe has a partly spherical socket. Each piston has an extension 140 at the right with a partly spherical end which is seated in the socket in the corresponding shoe 138. The flange 74 has suitable openings 141 which provide clearance for the piston extensions, as shown in the upper portion of FIG. 1. Each shoe 138 has a flat face at the right which engages the flat face of a nonrotary or stationary flange or abutment plate 142 on the member 50, the said face of the plate being inclined at a small angle with respect to a plane perpendicular to the axis of rotation. A spring 144 within each piston 136 biases the piston for movement toward the right. The several springs 144 acting through the piston extensions 140 serve to hold the several shoes 138 against the inclined plate 142. Inasmuch as the pistons 136 and their extensions 140 and the shoes 138 are carried by the ring 62, they revolve about the central axis and in so revolving the shoes 138 serve in co-operation with the springs 144 to reciprocate the pistons. Each piston is reciprocated once during each revolution.

Preferably, a central oil hole is provided in each piston extension 140 and there is a registering oil hole in the shoe. These oil holes serve to lubricate the engaging faces of the shoe and of the plate 142.

Formed in the inner ring 68 is an annular oil groove 146 which communicates through a radial oil hole 148 with the oil hole 124 in the member 10. Formed in the said inner ring 68 adjacent each pump is a recess 150 which communicates with the pump chamber through an oil hole 152. The said recess 150 communicates with the annular groove 146 through an oil hole 154. Formed in the outer ring 62 adjacent each pump in a recess 156 which communicates with the pump chamber through an oil hole 158. The recess 156 communicates with an annular oil groove 160 formed in the member 40. A normally closed but outwardly movable flap valve 162 is located in the recess 150 at the oil hole 154. A similar normally closed but outwardly movable flap valve 164 is located in the recess 156 at the oil hole 158.

As each pump piston 136 is moved outwardly or toward the right, the flap valve 164 remains closed and the flap valve 162 is opened, oil being drawn into the pump chamber from the annular groove 146, through the oil hole 154, the recess 150 and the oil hole 152. As the pump piston is moved inwardly or toward the left, the flap valve 162 is closed and the flap valve 164 is opened, oil being forced from the pump chamber through the oil hole 158 and the recess 156 into the annular oil groove 160. Inasmuch as there are five pumps acting successively, oil under pressure is continually supplied to the annular oil groove 160. The said groove 160 constitutes the before-mentioned secondary oil reservoir.

As has been explained, the several plungers 116, 116, 118 and 120, when engaged by the torque ring 102, are moved toward the left and serve to transmit pressure to the annular piston 110 and to the clutch plates by means of the oil in the annular chamber 112. The positions of the plungers vary longitudinally according to conditions of operation, but the positions shown in FIG. 1, or positions slightly to the left of those shown, may be typical for normal operation of the clutch mechanism by power transmitted from the shaft 13 through the driving member 10.

*Inlet Valve for Hydraulic System*

The plunger 118 differs from the plungers 116, 116 and is adapted to serve as an oil inlet valve. The said valve has an annular oil groove 166 which communicates by means of oil holes 168 with the valve interior. The member 40 has a radial oil hole 170 which communicates at its inner end with the annular secondary reservoir 160 and which terminates at its outer end at a port which communicates with the cylindrical opening for the valve 118. This oil hole constitutes a duct for supplying oil under pressure to the piston chamber 112. As shown, the annular groove 166 in the plunger valve is at the right of the port 170, the duct being closed and the flow of oil being prevented. However, if the supply of oil in the chamber 112 is depleted, as it is in any event at starting and as it may be at any time by reason of oil leakage, the several plungers including the plunger valve 118 are moved by the torque ring 102 to positions at the left of those shown in FIG. 1. When the plunger valve 118 is so moved, the groove 166 registers with the port of the duct 170, the duct being opened and oil under pressure being permitted to flow from the secondary reservoir 160 into the annular oil chamber 112. The pressure of the oil in the chamber tends to force all of the plungers and also the torque ring 102 toward the right until the plunger valve 118 reaches the position shown in FIG. 1, the port 170 then being closed and flow of oil into the chamber 112 then being stopped. Thus the plunger valve 118 serves to maintain a sufficient quantity of oil in the annular chamber 112 under all conditions during transmission of power by the clutch mechanism. Ordinarily there may be considerable leakage around the annular piston 110 and around the several plungers, and the inlet valve 118 is ordinarily positioned to maintain the port 170 partly open. With the port 170 partly open it is obvious that oil in the chamber 112 cannot be continually maintained at a pressure greater than that in the groove or reservoir 160.

*Exhaust Valve for Hydraulic System*

When the torque ring 102 is moved toward the right by reason of the increased speed of the member 12 or the decreased speed of the member 10, it is necessary or at least highly desirable to entirely eliminate all differential oil pressure within the annular chamber 112 so as to avoid any possible frictional drag by the clutch plates. To this end the plunger 120 is adapted to serve as an oil exhaust valve. The said valve has an annular oil groove 172 which communicates by means of oil holes 174 with the valve interior. The interior of the valve is or may be at least partly open at the left to communicate with the annular piston chamber 112. The member 40 has a radial oil drain hole 176 which terminates at its inner end at a port which communicates with the cylindrical chamber for the valve 120 and which communicates at its outer end with the main oil reservoir in the housing. With the valve in the position shown, the annular oil groove 172 is at the left of the port 176.

As the torque ring 102 moves toward the right, the several plungers including the valve plunger 120 move with it to decrease the pressure in the annular chamber 112. As the valve 120 so moves, the oil groove 172 registers with the port 176. The groove moves into complete register when the valve body is at its limit of movement toward the right, as determined by the stop ring. Inasmuch as the inlet valve 118 and the exhaust valve 120 move in unison, it will be apparent that, during movement toward the left, the oil drain port 176 is closed by the valve 120 before the oil supply port 170 is opened by the valve 118. During movement toward the right, the oil supply port 170 is closed by the valve 118 before the oil drain port 176 is opened by the valve 120.

As shown in FIGS. 1 and 3, the valve 120 has a central cylindrical opening which is closed at its left end except for a relatively small hole 178. The said central opening in the valve is closed at its right end by a longitudinally movable plug 180, the right end of which is normally flush with the right end of the valve. The plug 180 carries a central stem 182 on which is a longitudinally movable closure 184, the said closure being biased toward the left by a spring 185. With the parts in the positions shown in FIG. 1, the closure 184 closes the hole 178, being held in its closing position by the spring 185.

When the torque ring 102 permits the valve to move toward the right so that the annular oil groove 172 registers with the drain port 176, the central hole 178 is still closed by the closure 184, but if the pressure within the annular chamber 112 has not yet been sufficiently reduced, the pressure will force the closure 184 toward the right to permit oil to drain through the hole 178 and through the holes 174, the groove 172 and the hole 176. Further movement of the torque ring 102 toward the right to the position shown in FIG. 3 permits additional movement of the plug 180 toward the right. This withdraws the closure 184 from the central hole 178 and permits the escape of oil from the annular chamber 112. With the parts in the positions shown in FIG. 3, there can be no differential pressure in the said chamber 112. Due to centrifugal action there will be oil under pressure in the annular reservoir space within the outer portion of the main housing, but the pressure is equalized and is the same within the annular chamber 112 as it is outside of the said chamber. Oil holes 188 assist in the equalization of oil pressure.

The exhaust valve as shown in FIGS. 1 and 3 is particularly advantageous during starting, when the parts are initially in the positions shown in FIG. 3. The initial movement of the torque ring 102 toward the left moves the plug 180 toward the left to cause the closure 184 to close the central opening 178. Thus the annular oil chamber 112 is closed by a much smaller movement of the ring 102 than would be necessary if the closure 184 and the plug 180 were not provided. This expedites the application of pressure to the oil in the chamber 112, more particularly when there is very slight resistance to the rotation of the intermediate member.

*Alternative Exhaust Valve for Hydraulic System*

When there is substantial resistance to the rotation of the intermediate member, as for instance by reason of a fan driven thereby, a simpler exhaust valve may be provided in lieu of the exhaust valve shown in FIGS. 1 and 3, this alternative exhaust valve being shown in FIG. 4.

The body of the alternative valve 189 is generally similar to the body of the valve 118, being entirely open at the left and communicating with the annular chamber 112. The valve 189 has an annular oil groove 190 corresponding to the groove 174 of the valve 120, and it has oil holes 191 corresponding to the oil holes 174 of the valve 120. The valve 189 functions in a manner similar to that described in connection with the valve 120. However, in view of the omission of the interior parts including the closure 184 and the plug 180, oil is permitted to flow through the drain hole 176 as soon as the groove 172 registers therewith.

*Auxiliary Pump Mechanism for Hydraulic System*

It has been pointed out that when the member 12, which is normally the driven member, is rotated at a speed greater than that of the driving member 10, the ring 102 is moved toward the right to relieve the oil pressure in the chamber 112 and to permit the clutch plates to be separated by the springs 115. When this occurs, oil under pressure is no longer required in the reservoir 160 for supplying oil to the chamber 112, but oil under pressure is required in the reservoir 160 for lubricating purposes as hereinafter explained.

The various parts, other than the member 12 and the parts directly connected therewith, will rotate slowly or not at all, the result being that there will be little or no oil pumping action as heretofore described. To meet this condition, a second pump mechanism is provided for supplying oil under pressure to the reservoir 160 when the intermediate member is idle and when the normally driven member is rotated by external force, as for instance by autorotation of the rotor or rotors. Preferably and as shown, each pump chamber in the ring 62 has a second longitudinally reciprocable piston 192 similar to the piston 136 but oppositely disposed. A shoe 194 is provided for each piston 192 which shoe is similar to the shoes 138. Each shoe 194 engages a piston extension 196 on the corresponding piston 192. The said springs 144 abut at their left ends against the pistons 192 to bias them for movement toward the left. Each shoe 194 has a flat face at the left which engages the flat face of a flange or plate 198 on a member 200 carried by the member 12. The said face of the plate 198 is inclined at a small angle with respect to a plane perpendicular to the axis of rotation. Inasmuch as the member 200 and its plate 198 are rotatable, the inclination may be in any direction, and the direction shown is merely an example. Inasmuch as the pistons 192 and their extensions 196 and the shoes 194 are revolving slowly or not at all and the plate 198 on the member 12 is rotating at a higher speed, the said shoes 194 serve in cooperation with the springs 144 to reciprocate the pistons 192. The pumping action by the pistons 192 is the same as that previously described for the pistons 136. Preferably the piston extensions 196 and the shoes have oil holes for lubrication, these being similar to those in the piston extensions 140 and the shoes 138.

It will be apparent that the second pump mechanism does not operate when the clutch is fully engaged and when the intermediate and driven members are rotating in unison. However, when the intermediate member is idle or rotating slowly, the normally driven member 12 and the inclined flange 198 rotate relatively to the intermediate member to operate the second pump mechanism.

*Pressure Control Valve for Hydraulic System*

The pumping capacity of the several pumps is relatively large, the capacity being sufficient to take care of any leakage from the high pressure system. A relief or pressure control valve is provided as shown in FIGS. 6 and 7 for permitting the discharge of any excess oil from the annular secondary reservoir or groove 160 and for controlling pressure in the said reservoir.

The member 40 is provided with a radial cylindrical hole which communicates at its inner end with the groove or reservoir 160. Located within the said radial hole is a hollow cylindrical member 202 which is closed at its outer end and is held in place by a snap ring 204. The member 202 between its ends has a portion of reduced diameter providing an annular space at 206, this space communicating with an annular oil groove 208 in the member 40. The said groove 208 communicates through oil holes 210 and 212 with the interior of the housing. The member 202 has oil holes or ports 214, 214 between its interior and the said annular space 206.

Fixedly positioned within the cylindrical member 202 is a tube 216 which is open at both ends. Slidably guided by the tube 216 and fitting the interior of the cylindrical member 202 is a valve element 218. A spring 220 biases the valve element for outward movement, but outward movement is limited to provide a space between the outer end of the valve element and the end wall of the member 202. The valve element has an annular groove 222 and a longitudinal groove 224 extending between the annular groove and the outer end of the element.

When the oil pressure in the annular groove or reservoir 160 is below a predetermined critical value, the parts are in the positions shown in FIG. 6. The valve element is held in its outermost position partly by the action of the spring 220 and partly by centrifugal force. In this position the valve is closed and no oil can be discharged. When the oil pressure is increased, the oil acts on the outer end face of the valve element 218 to move it inwardly toward the position shown in FIG. 7, the ports 214 being at least partly opened. With the said ports open or partly open, oil is discharged through the longitudinal groove 224, the annular groove 222, the ports 214, the annular space 206, the annular groove 208 and the oil holes 210 and 212.

Inasmuch as centrifugal force tends to hold the valve element 202 in its outer or closed position as shown in FIG. 6 and inasmuch as increased oil pressure tends to move it toward its inner or open position as shown in FIG. 7, it will be apparent that for any particular speed a condition of equilibrium is established with the ports 214 partly closed. For a different speed there is a different condition of equilibrium. The result is that a pressure is maintained within the groove or reservoir 160 that is variable directly with the speed, oil at the said pressure being available for flow to the annular chamber 112. For any particular speed the valve maintains a constant pressure in the reservoir 160, thus insuring reliable control of the clutch by the torque transmitted from the driven member to the intermediate member.

The variation of oil pressure in the reservoir 160 in accordance with speed is important, as it prevents the sudden transmission of abnormally high torque to the rotor or rotors. With all of the parts rotating at a relatively low speed, the speed of the motor may be rapidly or suddenly increased. If the oil pressure were at a maximum and if the port 170 were suddenly opened, the clutch would be immediately engaged to the maximum extent and the sudden increase in motor speed would be transmitted to the rotor or rotors with possible damage thereto. However, with a relatively low oil pressure in the reservoir 160 only a corresponding low pressure can be transmitted to the chamber 112 and the clutch will slip, the result being that the speed of the rotor or rotors will be increased gradually. Of course, the oil pressure in the reservoir 160 will increase with the motor speed, but there is a sufficient lag in the increase of the oil pressure to permit the speed of the rotor or rotors to be gradually increased as stated. The pressure in the chamber 112 and on the clutch plates is normally proportionate to the torque, but the provision of a relatively low pressure in the reservoir 160 at relatively low speeds prevents unduly sudden increases in the torque transmitted by the clutch.

*Alternative Pressure Control Valve for Hydraulic System*

The pressure control valve, as shown in FIGS. 6 and 7 and as described, provides at least a minimum oil pressure at all speeds within a normal operating range. When the driven member is rotated, power is always transmitted through the clutch mechanism, except when the hereinafter described hold-out valve is operated. However, it may be desirable to make it possible for the motor and the drive member to operate freely at low speeds without any transmission of power by the clutch mechanism, but with power transmission being automatically initiated as the motor speed is increased. When the last-described manner of operation is desired, an alternative pressure control valve is provided as shown in FIG. 8.

When the alternative valve is provided no changes are required in the member 40. Located within the radial hole in the member 40 is a hollow cylindrical member 225 which is closed at its outer end and is held in place by a snap ring. The member 225 has a portion of reduced diameter which provides an annular space 226, this space communicating with the annular groove 208 in the member 40. The member 225 has longitudinally spaced oil holes or ports 227 and 228 between its interior and the said annular space 226.

Fixedly positioned within the member 225 is a central tube which is open at both ends. Slidably guided by the tube and fitting the interior of the member 225 is a valve element 229. A spring biases the valve element 229 for inward movement and tends to hold it in the position shown in FIG. 8.

The parts remain in the last said positions when the driving member and the intermediate member are rotating at relatively low speeds and oil flows from the groove or high pressure reservoir 160 through the central tube, through the ports 227, through the annular space 226, through the annular groove 208, and through the oil holes 210 and 212. Thus no substantial pressure can be established in the groove or reservoir 160, but the pressure is sufficient for lubricating purposes as hereinafter described. Even though the several plungers 116, 116, 118 and 120 be moved toward the left by the torque ring 102, the pressure in the reservoir 160 cannot be such as to establish a pressure in the chamber 112 sufficient to overcome the springs 115 and thus cause engagement of the clutch plates. This permits the motor to be operated at low speeds for warm-up purposes without the transmission of any power through the clutch mechanism and without rotating the rotor or rotors.

When the motor speed is increased above a predetermined critical speed, the valve element 229 is moved outwardly by centrifugal force to at least partly close the ports 227. The ports 228 permit oil to fill the space at the inner end of the valve element 229 as the said element moves outwardly. As the ports 227 are partly closed, the flow of oil from the groove or reservoir 160 is restricted and pressure is built up in the said groove or reservoir and resultantly in the annular chamber 112. The outward movement of the valve element 229 is resisted by the increased oil pressure at the outer end thereof, and therefore for any particular speed a condition of equilibrium is established with the ports 227 partly closed. The result is that, for any speed above the said critical speed, a pressure is maintained within the groove or reservoir 206 that is variable directly with the speed.

*Hold-Out or By-Pass Valve for hydraulic System*

A hold-out or by-pass valve is provided for preventing the establishment of pressure in the hydraulic system, so as to cause the clutch mechanism to be inoperative for the transmission of power to the rotor or rotors. This valve frees the motor from load during starting and it permits the motor to be operated without load and at any required speed for warm-up purposes.

The said hold-out or by-pass valve and the oil connections therefor are shown in FIG. 9 wherein the member 10 is in section through the before-mentioned longitudinal oil hole 126. The oil hole 126 is closed at its right end by a plug 229ᵃ. The said member 10 has a radial oil hole 230 which connects the oil hole 126 with an annular oil groove 231 in the inner ring 68. An outwardly extending oil hole 232 in the ring 68 connects the groove 231 with a radial oil hole 234 in the outer ring 62. Fitting an enlarged portion of the hole 234 and a registering hole in the member 40 is a generally cylindrical hollow member 236 closed at its outer end. The member 236 has radial holes 238 which communicate with an annular groove 240 in the member 40. An oil hole 242 connects the annular pressure chamber 112 with the annular groove 240. Thus an oil passageway is established from the chamber 112 to the longitudinal oil hole 126 in the member 10.

The member 10 has a radial oil hole 244 which connects the oil hole 126 with an annular oil groove 246 in the bushing 52. Packing rings 248, 248 are seated in grooves in the member 10 at opposite sides of the oil groove 246. These packing rings prevent oil from escaping from the annular groove 246 by longitudinal flow along the bushing 52.

Threaded into the stationary member 50 is a hollow valve body 250 having a hollow inner portion with radial holes 252 which communicate with an annular oil groove 254 in the member 50. An oil hole 255 connects the groove 254 with the interior of the main housing. Longitudinally movable in the valve body 250 is a valve element 256, the inner end of which extends into and fits the inner portion of the valve body 250. The valve element 256 is biased by a spring 257 to its inner position as shown, the valve element in this position closing the oil holes 252 in the inner portion of the valve body and preventing the escape of oil through the groove 254 and the hole 255. Connected with the valve body 250 is a flexible tubular member 258 having a longitudinally movable inner element connected with the valve element 256. The flexible member 258 extends to a position for convenient access by the operator or pilot. By relatively moving the inner element of the flexible member 258, the valve element 256 can be withdrawn in opposition to the spring 257 so as to expose the oil holes 252 in the inner portion of the valve body and so as to permit the flow of oil from the annular groove 246 and the longitudinal hole 126, through the oil holes 252 and the oil groove 254 and the oil hole 255.

The valve 250, 256 serves as a hold-out valve. When the valve is closed, as shown, the clutch mechanism operates as previously described. However, when the valve is opened, a bleeding connection or by-pass is established from the annular chamber 112 through the various holes and grooves as described and to the oil hole 255. This prevents the building up of any substantial pressure in the annular chamber 112 and enables the motor to be operated for starting and for warming up without transmitting any power through the clutch mechanism.

When a relief or pressure control valve is provided as shown in FIGS. 6 and 7, the hold-out or by-pass valve serves as the means for initiating the operation of the clutch mechanism and for thus initiating the rotation of the rotor or rotors. Upon the termination of flight, the said by-pass valve serves to discontinue the operation of the clutch mechanism while permitting the motor to continue to operate at idling speed.

When the alternative relief or pressure control valve is provided as shown in FIG. 8, the by-pass valve does not serve to initiate or discontinue the rotation of the rotor or rotors, this being effected by an increase or decrease in motor speed as previously explained. However, the by-pass valve is necessary to permit the motor to be operated during starting and warm-up at speeds above the critical speed at which the relief valve causes the initiation of clutch operation.

As has been explained, the by-pass valve is connected with the piston chamber 112 rather than with the oil reservoir 160. This is important as it permits pressure for lubrication purposes, as hereinafter described to be maintained in the annular reservoir 160. The bleeding of oil from the chamber 112 by the by-pass valve does not prevent the maintenance of pressure in the reservoir 160, but if the by-pass valve were connected with the said reservoir 160 there would be no pressure therein and there would be a failure of lubrication.

Torque Indicating Means

It has been pointed out that when the clutch mechanism is transmitting power, the torque is exactly proportionate to the oil pressure in the annular chamber 112. Advantage is taken of this fact to enable the clutch mechanism to serve as a torque meter. The annular groove 246 is connected with the chamber 112 as shown in FIG. 9 and as previously described, and the pressure in the said groove is therefore proportional to that in the chamber. Reverting to FIG. 1, a hose connector 260 is threaded into the member 50 with its interior connected with the said groove 246 by an oil hole 262. The connector 260 serves to connect a pipe or hose 264 which extends to a suitable pressure gage 266 as shown schematically in the upper right portion of FIG. 1. The torque gage 266 is properly calibrated to show the torque being transmitted by the clutch mechanism.

Lubricating Means

Figure 10:
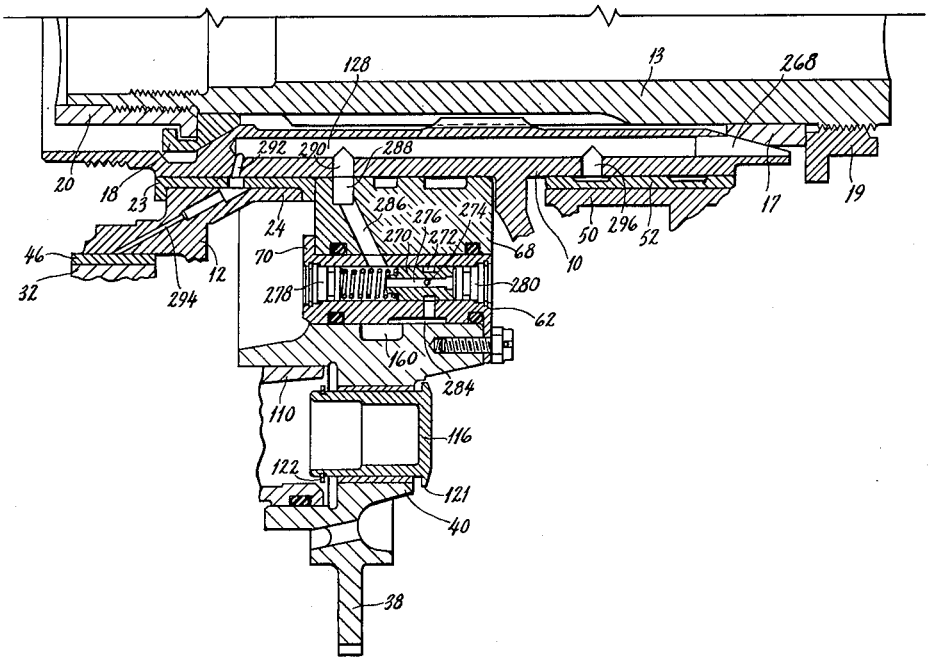
FIG. 10 is a fragmentary longitudinal sectional view taken along the line 10—10 of FIG. 5, this view omitting various parts as to which the showing would be substantially the same as that of FIG. 1.
Figure 11:
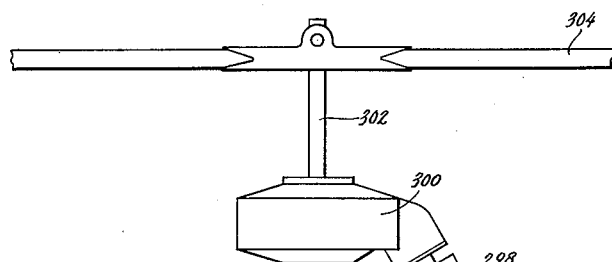
FIG. 11 is a schematic view of certain portions of a helicopter embodying the invention.

FIG. 10 shows the member 10 in section through the before-mentioned longitudinal oil hole 128. The oil hole 128 is closed at its right end by a plug 268. Oil from the annular groove 160 in the member 40 is delivered to the oil hole 128 and is distributed from the hole 128 to the several bearing surfaces requiring lubrication. In order that the oil flow may be limited to that required for lubrication a flow control valve is provided.

A cylindrical valve element 270 is longitudinally movable in a hole in the outer ring 62. The valve element has an annular oil groove 272, and one or more radial holes 274 connect the groove 272 with a central hole 276 open at both ends. The hole in the ring 62 is closed at its ends by plugs 278 and 280, and a spring 282 abutting against the plug 278 tends to hold the valve element in its right position as determined by the plug 280.

The ring 62 has an oil pasage 284 which connects the annular groove 160 with the annular groove 272 when the valve element is in its said right position. An oil hole 286 in the rings 62 and 68 connects the valve opening with an annular groove 288 in the ring 68. A radial oil hole 290 in the member 10 connects the groove 288 with the longitudinal hole 128.

Oil under pressure flows from the groove 160 through the passage 284, the groove 272 and the holes 274 to the central hole 276 in the valve element 270. Some of the oil flows toward the left and through the oil hole 286 to the longitudinal oil hole 128. However, some of the oil also flows toward the right into the space between the valve member 270 and the plug 280. This last said oil becomes static and exerts a pressure substantially equal to the pressure in the annular groove 160 against the area of the valve element 270. The restriction of the central hole 276 as to oil flowing toward the left causes a loss of pressure. When the loss of pressure exceeds the force exerted by the spring 282, the valve 270 moves to the left. Thus the opening into the groove 272 is reduced and the flow of oil is restricted, this limiting the flow at all positions beyond the valve.

An oil hole 292 in the member 10 connects the said longitudinal oil hole 128 with the annular space between the two bearing bushings 23 and 24, thus providing lubrication for the bearing surfaces of the said bushings. An oil hole 294 in the member 12 connects the annular space between the bushings 23 and 24 with the bearing surfaces of the said member 12 and the bushing 46. Thus the last-mentioned bearing surfaces are lubricated. An oil hole 296 in the member 10 connects the longitudinal oil hole 128 with the bearing surfaces of the member 10 and the bearing bushing 52, thus providing lubrication for the latter. The several above-mentioned oil holes for lubrication are in rotatable parts and the said holes are shown in FIG. 10 only for convenience of illustration.

Schematic Showing of Helicopter Parts

The rotor and the power mechanism of a helicopter are shown schematically in FIG. 11. The motor is indicated at 14, and the hereinbefore-mentioned clutch mechanism is shown at A. The before-mentioned rotor connected rotatable member is shown at 15. Connected with the member 15 is a drive shaft 298, the said drive shaft being connected with a transmission mechanism 300 which may be of any usual or suitable type. Extending upwardly from the transmission mechanism 300 and driven thereby is a shaft 302. Connected with the shaft 302 at the upper end thereof and driven thereby is a rotor 304 which may be of any usual or suitable type. It will be understood that the shaft 298, the transmission mechanism 300 and the shaft 302 constitute a positive power transmitting means between the member 15 and the rotor 304, the said member 15 and the said rotor always rotating in synchronism.

General Summary of Operation

Preparatory to starting the motor, the hold-out valve shown in FIG. 9 is opened, thus preventing the building up of any substantial pressure in the annular piston chamber 112. The motor is started in the usual manner and, with the hold-out valve open, the motor can be operated at any required speed for warm-up purposes without transmitting any motion to the rotor or rotors.

After the completion of warm-up, the motor is operated at an idling speed and the hold-out valve is closed. This permits pressure to be established in the annular chamber 112. Assuming that a pressure control valve is provided as shown in FIGS. 6 and 7, the closing of the hold-out valve causes the clutch mechanism to immediately function in the manner that has been described.

Rotation of the driving member 10 causes the torque ring 102 to move toward the left so as to move the plungers 116, 116, 118 and 120 toward the left. As the said plungers move toward the left, they build up pressure in the annular chamber 112, this pressure acting on the piston 110 to cause engagement of the clutch plates. The pressure in the chamber 112 resists continued movement of the plungers and of the ring 102 toward the left, and when the ring 102 can no longer so move it transmits rotary motion to the housing or intermediate member. When the intermediate member is rotated, power is transmitted through the clutch from the said intermediate member to the driven member and thence through the described power connections to the rotor or rotors. As the plunger or valve 118 moves toward the left it at least partly opens the port 170 to permit oil under pressure to flow into the chamber 112 from the annular secondary reservoir 160. As the plunger or valve 120 moves toward the left it closes the previously open drain port 176 to prevent the draining of oil through the said port. The pressure applied by the several plungers to the oil in the chamber 112 and therefore the pressure applied by the piston 110 to the clutch plates varies directly with the torque transmitted from the driven member 10 to the housing or intermediate member.

By means of the pump pistons at the right, one of which is shown in FIG. 1, oil under pressure is supplied to the groove or reservoir 160 and thence to the port 170. By reason of leakage the port 170 is ordinarliy partly open. The pressure control valve shown in FIGS. 6 and 7 serves to cause an increase in the pressure in the reservoir 160 as the speed of rotation increases beyond a predetermined critical speed. Therefore pressure available to the annular chamber 112 varies with the speed. For a low speed only relatively small pressure is available, thus preventing a sudden increase in the power transmitted by the clutch.

When the alternative pressure control valve shown in

FIG. 8 is provided, the operation is the same as last above described with the exception that no substantial pressure can be established in the reservoir 160 until the driven and intermediate members are rotated at a speed exceeding a critical speed. This permits the motor to operate at an idling speed without transmitting any motion to the rotor or rotors. As the speed is gradually increased above the said critical speed, pressure is gradually established in the groove or reservoir 160 and in the annular chamber 112 to cause the gradual engagement of the clutch and the gradual starting of the rotor or rotors.

When the speed of the driving member is decreased, either by reason of motor failure or otherwise, the rotor or rotors continue to rotate aerodynamically, but the driving member is idle or rotates at a reduced speed. The clutch initially remains engaged, with the result that the rotation of the housing or intermediate member is momentarily continued at a speed greater than the reduced speed of the driving member. The result is that the torque ring 102 is moved toward the right, thus permitting the several plungers to move toward the right. This releases the pressure in the annular chamber 112 and permits the disengagement of the clutch plates by the springs 115. Movement of the plunger or valve 120 opens the drain port 176 to more definitely release any residual pressure in the chamber 112. Thus the rotor or rotors are free for autorotation without transmitting any motion to the intermediate member of the clutch or to the driving member thereof or to the motor.

The oil pressure in the annular groove or reservoir 160 is normally maintained, as before stated, by the pump pistons at the right. The oil in the reservoir serves not only to operate the clutch in the manner described, but also serves for lubrication purposes. The lubricating pressure is controlled by the valve shown in FIG. 10. With the intermediate and driven members idle the pump pistons at the right no longer operate. In order to maintain continued pressure in the groove or reservoir 160 for lubrication purposes, the pump plungers at the left are operable during autorotation.

Whenever power is being transmitted through the clutch mechanism to drive the rotor or rotors, the torque transmitted by the said clutch mechanism can be observed by means of the torque gauge 266.

In the foregoing summary of the operation it has been assumed that the clutch mechanism is used in its primarily intended manner with the rotor or other alternately driven element connected with the power member 12 and with the motor connected with the power member 10. It should be observed, however, that the clutch is not necessarily limited to use in this particular manner. The power member 12 that has been referred to as the driven member may become the driving member, and the power member 10 that has been referred to as the driving member may become the driven member. When the member 12 is the driving member, the direction of rotation must be opposite to that previously described so that the torque ring 102 will continue to tend to move toward the left and apply pressure to the clutch. It would further be necessary to reverse the opening in the intake tube 134. Except for the direction of rotation, the manner of operation is generally similar to that previously described, but it should be observed that in the event of any rotation of the driven member 10 at a speed greater than that of the driving member 12, the intermediate member rotates in unison with the driven member and not in unison with the driving member.

The invention claimed is:

1. In a clutch mechanism for a helicopter, the combination of a normally rotating driving member, a normally driven member connectible with the rotor of the helicopter for rotation in a selected direction, a rotatable intermediate member, mechanism for transmitting power from the driving member to the intermediate member which mechanism includes a torque element connected for movement relatively to at least one of said members and tending to so move with a force dependent upon the amount of the transmitted torque, a friction clutch so constructed and connected that it serves upon the application of pressure thereto or the release of said pressure therefrom to make or break a power connection between the intermediate member and the driven member, clutch control means located between said relatively movable torque element and said clutch and including an oil-containing hydraulic chamber with a movable piston for applying pressure to the clutching, and a pressure device directly actuated by said torque element and dependent upon said relative movement thereof for mechanically applying pressure to the oil in said hydraulic chamber which last said pressure varies with the torque transmitted from said driving member to said intermediate member with resultant corresponding variation in the ability of said friction clutch to transmit power from said intermediate member to said driven member.

2. In a clutch mechanism for a helicopter, the combination of a normally driven member connectible with the rotor of the helicopter for rotation in a selected direction either by power transmitted thereto from the driving member or by power transmitted thereto by the rotor upon autorotation thereof, a rotatable intermediate member, means for transmitting power from one to the other of said driving and intermediate members which means includes a torque element connected for movement relatively to at least one of said members in a first direction when torque is transmitted to said intermediate member and in a second opposite direction when torque is transmitted to said driving member, said element tending to be so moved with a force dependent upon the amount of the transmitted torque, a friction clutch so constructed and connected that it serves upon the application of pressure thereto in said first direction or the release of said pressure therefrom to make or break a power connection between the intermediate member and the driven member, clutch control means located between said relatively movable torque element and said clutch and including an oil-containing hydraulic chamber with a movable piston for applying pressure to the clutch, and a pressure device directly actuated by said torque element and dependent upon said relative movement thereof in said first direction for mechanically applying pressure to the oil in said hydraulic chamber which last said pressure varies with the torque transmitted from said driving member to said intermediate member with resultant corresponding variation in the ability of said friction clutch to transmit power from said intermediate member to said driven member, said pressure device upon relative movement of the torque element in said second direction serving to release the pressure applied to the oil in said hydraulic chamber with resultant breaking of the power connection between the intermediate member and the driven member so that the latter is free to independently rotate.

3. In a clutch mechanism for a helicopter, the combination of a normally rotating driving member, a normally driven member connectible with the rotor of the helicopter for rotation in a selected direction, a rotatable intermediate member, means for transmitting power from the driving member to the intermediate member, a friction clutch serving upon the application or release of pressure to establish or break a power connection between the intermediate member and the driven member, means including a hydraulic system operatively interposed between the said power transmitting means and the said clutch for applying and releasing the said pressure on the clutch, means dependent upon the torque in the said means for transmitting power from the driving member to the intermediate member for increasing or decreasing oil pressure in the hydraulic system in accordance with variations in the said torque, and speed responsive means additional to and separate from said torque dependent means for varying oil pressure in the hydraulic system in accordance with the rotative speed of the driving and intermediate members, said speed responsive means being carried by and rotatable with said intermediate member.

4. In a clutch mechanism for a helicopter, the combination of a normally rotating driving member, a normally driven member connectible with the rotor of the helicopter for rotation in a selected direction, a rotatable intermediate member, means for transmitting power from the driving member to the intermediate member, a friction clutch serving upon the application or release of pressure to establish or break a power connection between the intermediate member and the driven member, means including a hydraulic system operatively interposed between the said power transmitting means and the said clutch for applying and releasing the said pressure on the clutch, means dependent upon the torque in the said means for transmitting power from the driving member to the intermediate member for increasing or decreasing oil pressure in the hydraulic system in accordance with variations in the said torque, and speed responsive means carried by said intermediate member and additional to and separate from said torque dependent means, said speed responsive means being constructed and arranged for preventing pressure in the hydraulic system when the driving and intermediate members have a rotative speed below a predetermined critical speed and for causing the establishment of oil pressure in the said system with the driving and intermediate members having a rotative speed above the said critical speed.

5. In a clutch mechanism for a helicopter, the combination of a normally rotating driving member, a normally driven member connectible with the rotor of the helicopter for rotation in a selected direction, a rotatable intermediate member, means for transmitting power from the driving member to the intermediate member, a friction clutch serving upon the application or release of pressure to establish or break a power connection between the intermediate member and the driven member, means including a hydraulic system operatively interposed between the said power transmitting means and the said clutch for applying and releasing the said pressure on the clutch, means dependent upon the torque in the said means for transmitting power from the driving member to the intermediate member for increasing or decreasing oil pressure in the hydraulic system in accordance with variations in the said torque, manually controlled means for establishing a by-pass for the hydraulic system to permit the driven member to remain idle while the driving member continues to rotate, and speed responsive means carried by said intermediate member and additional to and separate from said torque dependent means, said speed responsive means being constructed and arranged for preventing pressure in the hydraulic system when the driving and intermediate members have a rotative speed below a predetermined critical speed and for causing the establishment of oil pressure in the said system with the driving and intermediate members having a rotative speed above the said critical speed.

6. In a clutch mechanism for a helicopter, the combination of a normally rotatable driving member, a rotatable normally driven member, a rotatable intermediate member concentric with the driving and driven members and rotatable relatively to said driving and driven members, said intermediate member comprising a housing surrounding portions of the said driving and driven members, two longitudinally spaced seals interposed respectively between the intermediate member and the last said portions of the driving and driven members, said seals serving in conjunction with said intermediate and driving and driven members to constitute an oil tight housing, means within the said housing for transmitting power from the driving member to the said intermediate member or housing, means located within the said housing and variable in effectiveness for transmitting power from the intermediate member or housing to the driven member, and means located within the said housing and dependent upon the torque in the first said power transmitting means for varying the effectiveness of the second said power transmitting means.

7. In a clutch mechanism for a helicopter, the combination of a normally rotatable driving member, a rotatable normally driven member, a rotatable intermediate member concentric with the driving and driven members and rotatable relatively to said driving and driven members, said intermediate member comprising a housing surrounding portions of the said driving and driven members, two longitudinally spaced seals interposed respectively between the intermediate member and the last said portions of the driving and driven members, said seals serving in conjunction with said intermediate and driving and driven members to constitute an oil tight housing, means within the said housing for transmitting power from the driving member to the said intermediate member or housing, a releasable clutch located within the housing and operable to establish and break a power connection between the intermediate member or housing and the driven member, and means located within the said housing and connected with the said power transmitting means for operating the clutch to establish the said power connection between the intermediate member or housing and the driven member when power is transmitted from the driving member to the intermediate member or housing, the last said means being constructed and arranged for operating the clutch to break the said power connection between the intermediate member or housing and the driven member when the said driven member is rotated by external force and momentarily rotates the intermediate member or housing at a speed higher than the speed thereof corresponding to that of the driving member.

8. In a clutch mechanism for a helicopter, the combination of a normally rotatable driving member, a rotatable normally driven member, a rotatable intermediate member concentric with the driving and driven members and rotatable relatively to said driving and driven members, said intermediate member comprising a housing surrounding portions of the said driving and driven members, two longitudinally spaced seals interposed respectively between the intermediate member and the last said portions of the driving and driven members, said seals serving in conjunction with said intermediate and driving and driven members to constitute an oil tight housing, means within the housing for transmitting power from the driving member to the intermediate member, a friction clutch within the housing serving upon the application of pressure thereto to establish a power connection between the intermediate member or housing and the driven member, means located within the housing and including a hydraulic system interposed between the said power transmitting means and the said clutch for applying pressure to the clutch, and means located within the housing and dependent upon the torque in the said power transmitting means for increasing oil pressure in the hydraulic system to cause the said system to apply pressure to the clutch.

9. In a clutch mechanism for a helicopter, the combination of a normally rotatable driving member, a rotatable normally driven member, a rotatable intermediate member concentric with the driving and driven members and comprising a housing enclosing portions of the said members, a transverse partition within the housing providing two chambers at opposite sides thereof, means located within the housing and within the chamber at one side of the partition for transmitting power from the driving member to the intermediate member, a friction clutch located within the housing and within the chamber at the other side of the partition which clutch serves upon the application of pressure thereto to establish a power connection between the intermediate member or housing and the driven member, means located within the housing and including a hydraulic system interposed between the said power transmitting means and the said clutch for applying pressure to the clutch, and means located within the housing and dependent upon the torque in the said power transmitting means for increasing oil pressure in the hydraulic system to cause the said system to apply pressure to the clutch.

10. In a clutch mechanism for a helicopter, the combination of a normally rotating driving member, a rotatable normally driven member, a rotatable intermediate member concentric with the driving and driven members and rotatable relatively to said driving and driven members, said intermediate member comprising a housing surrounding portions of the said driving and driven members, two longitudinally spaced seals interposed respectively between the intermediate member and the last said portions of the driving and driven members, said seals serving in conjunction with said intermediate and driving and driven members to constitute an oil tight housing, means within the housing for transmitting power from the driving member to the intermediate member, a friction clutch within the housing serving upon the application or release of pressure to establish or break a power connection between the intermediate member and the driven member, means located within the housing and including a hydraulic system interposed between the said power transmitting means and the said clutch for applying pressure to the clutch and for releasing pressure thereon, and means located within the housing and connected with the said power transmitting means for increasing oil pressure in the hydraulic system to cause the said system to apply pressure to the clutch when power is transmitted from the driving member to the intermediate member, the last said means being constructed and arranged to decrease oil pressure in the hydraulic system so as to release the said pressure on the clutch when the said driven member is rotated by external force and momentarily rotates the intermediate member at a speed higher than the speed thereof corresponding to that of the driving member.

11. In a clutch mechanism for a helicopter, the combination of a driving member and a normally driven member and an intermediate member all rotatable about the same axis and in the same direction, the said intermediate member having an annular oil recess concentric with the said axis and open at one end, a friction clutch concentric with the intermediate member and the driven member and adjacent the open end of the said recess in the intermediate member, the said clutch serving upon the application of pressure thereto to establish a power connection between the intermediate member and the driven member, an annular piston fitting the annular recess in the intermediate member and cooperating therewith to provide a normally closed annular oil chamber which piston engages the clutch to apply pressure thereto, means for transmitting power from the driving member to the intermediate member, and means dependent upon the torque in the said power transmitting means and acting directly on the oil in the said annular chamber independently of the clutch and serving for increasing the pressure in said oil so as to cause the said piston to move longitudinally and thereby apply pressure to the clutch.

12. In a clutch mechanism for a helicopter, the combination of a driving member and a normally driven member and an intermediate member all rotatable about the same axis and in the same direction, the said intermediate member having an annular oil recess concentric with the said axis and open at one end and also having a plurality of circumaxially spaced longitudinal plunger chambers communicated with the said annular oil chamber, a friction clutch concentric with the intermediate member and the driven member and adjacent the open end of the said recess in the intermediate member, the said clutch serving upon the application of pressure thereto to establish a power connection between the intermediate member and the driven member, an annular piston fitting the annular recess in the intermediate member and cooperating therewith to provide a normally closed annular oil chamber which piston engages the clutch to apply pressure thereto, a plurality of plungers respectively fitting the plunger chambers and longitudinally movable therein, means for transmitting power from the driving member to the intermediate member, and means dependent upon the torque in the said power transmitting means for simultaneously moving all of the plungers to increase the pressure on oil in the said annular chamber and to thereby cause the said annular piston to move longitudinally and thereby apply pressure to the clutch.

13. In a clutch mechanism for a helicopter, the combination of a driving member and a normally driven member and an intermediate member all rotatable about the same axis and in the same direction, means for transmitting power from the driving member to the intermediate member, a friction clutch serving upon the application or release of pressure to establish or break a power connection between the intermediate member and the driven member, means including a hydraulic system operatively interposed between the said power transmitting means and the said clutch for applying pressure to the clutch and for releasing pressure thereon, a clutch controlling member rotatable about the said axis and longitudinally movable in one direction to increase oil pressure in the hydraulic system and thus apply pressure to the clutch and longitudinally movable in the opposite direction to decrease oil pressure in the hydraulic system and thus release the pressure on the clutch, and means connected with the said power transmitting means for positively moving the clutch controlling member in the first said direction when power is transmitted from the driving member to the intermediate member, the last said means being constructed and arranged for positively moving the said clutch controlling member in the second said direction when the said driven member is rotated by external force and momentarily rotates the said intermediate member at a speed higher than that of the driving member.

14. In a clutch mechanism for a helicopter, the combination of a driving member and a normally driven member and an intermediate member all rotatable about the same axis and in the same direction, a friction clutch serving upon the application or release of pressure to establish or break a power connection between the intermediate member and the driven member, a hydraulic system for applying pressure to the clutch and for releasing pressure thereon, a rotatable clutch actuating ring concentric with the said axis and longitudinally movable in one direction to increase the oil pressure in the hydraulic system and thus apply pressure to the clutch and longitudinally movable in the opposite direction to decrease the oil pressure in the hydraulic system and thus release the pressure on the clutch, and means including helical teeth on the driving member and on the ring for moving the ring upon the transmission of power from the driving member which helical teeth serve to move the ring longitudinally in the first said direction and then serve to rotate the ring and thus rotate the intermediate member, the said teeth upon the rotation of the intermediate member at a speed greater than that of the driven member serving to move the ring longitudinally in the second said direction.

15. In a clutch mechanism for a helicopter, the combination of a driving member and a normally driven member and an intermediate member all rotatable about the same axis and in the same direction, the said intermediate member having an annular oil recess concentric with the said axis and open at one end and also having a plurality of circumaxially spaced longitudinal plunger chambers communicating with the said annular oil chamber, a friction clutch concentric with the intermediate member and the driven member and adjacent the open end of the said recess in the intermediate member, the said clutch serving upon the application of pressure thereto to establish a power connection between the intermediate member and the driven member, an annular piston fitting the annular recess in the intermediate member and cooperating therewith to provide a normally closed annular oil chamber which piston engages the clutch to apply pressure thereto, a plurality of plungers respectively fitting the plunger chambers and longitudinally movable therein, means for transmitting power from the driving member to the intermediate member, and means dependent upon the torque in the said power transmitting means for simultaneously moving all of the plungers to increase the pressure on oil in the said annular chamber and to thereby cause the said annular piston to move longitudinally and thereby apply pressure to the clutch.

16. In a clutch mechanism for a helicopter, the combination of a normally rotating driving member, a rotatable normally driven member, a rotatable intermediate member, a clutch serving upon the application or release of pressure to establish or break a power connection between the intermediate member and the driven member, hydraulic means including an oil chamber and a piston for applying pressure to the clutch and for releasing pressure thereon, means having at least one plunger chamber communicating with the said oil chamber, at least one plunger fitting a corresponding plunger chamber and movable therein, means for transmitting power from the driving member to the intermediate member, means associated with the said power transmitting means for moving the said plunger in one direction to increase the oil pressure in the oil chamber when power is transmitted from the driving member to the intermediate member which means permits movement of the plunger in the opposite direction to decrease oil pressure in the oil chamber when the said driven member is rotated by external force and momentarily rotates the intermediate member at a speed higher than the speed corresponding to that of the driving member, means including a port for supplying oil under pressure to the said oil chamber, and means serving to open the said oil supply port upon movement of the plunger in the pressure increasing direction and serving to close the said oil supply port upon movement of the plunger in the pressure decreasing direction.

17. A clutch mechanism for a helicopter as set forth in claim 16, wherein a main oil reservoir is provided, wherein a secondary oil reservoir is provided, wherein means is provided for withdrawing oil from the main oil reservoir and delivering it to the secondary oil reservoir, and wherein the oil supply port is connected with the said secondary oil reservoir.

18. In a clutch mechanism for a helicopter, the combination of a driving member and a normally driven member and an intermediate member all rotatable about the same axis and in the same direction, a friction clutch concentric with the intermediate member and the driven member serving upon the application or release of pressure to establish or break a power connection between them, a hydraulic system including a normally closed annular oil chamber and a longitudinally movable annular piston engageable with the clutch, a plurality of circumaxially spaced plungers longitudinally movable in opposite directions for increasing or decreasing oil pressure in the annular chamber to cause the piston to apply or release pressure on the clutch, means for transmitting power from the driving member to the intermediate member, means associated with the said power transmitting means for simultaneously moving all of the said plungers in one direction to increase the oil pressure in the oil chamber when power is transmitted from the driving member to the intermediate member which means permits movement of all of the said plungers in the opposite direction to decrease oil pressure in the annular oil chamber when the said driven member is rotated by external force and momentarily rotates the intermediate member at a speed higher than that of the driving member, means including a port for supplying oil under pressure to the said annular oil chamber, and means serving to open the said oil supply port upon movement of one of the said plungers in the pressure increasing direction and serving to close the said oil supply port upon movement of the said plunger in the pressure decreasing direction.

19. In a clutch mechanism for a helicopter, the combination of a normally rotating driving member, a rotatable normally driven member, a rotatable intermediate member, a clutch serving upon the application or release of pressure to establish or break a power connection between the intermediate member and the driven member, hydraulic means including an oil chamber and a piston for applying pressure to the clutch and for releasing pressure thereon, means having at least one plunger chamber communicating with the said oil chamber, at least one plunger fitting a corresponding plunger chamber and movable therein, means for transmitting power from the driving member to the intermediate member, a clutch controlling member associated with the said power transmitting means for moving the said plunger in one direction to increase the oil pressure in the oil chamber when power is transmitted from the driving member to the intermediate member which clutch controlling member permits movement of the plunger in the opposite direction to decrease oil pressure in the oil chamber when the said driven member is rotated by external force and momentarily rotates the intermediate member at a speed higher than the speed corresponding to that of the driving member, means including a port for draining oil from the said oil chamber, and means serving to close the said oil drain port upon movement of the clutch controlling member in the pressure increasing direction and serving to open the said oil drain port upon movement of the clutch controlling member in the pressure decreasing direction.

20. A clutch mechanism for a helicopter as set forth in claim 19, wherein the plunger has an opening therein which communicates with the oil chamber and has a connected opening therein which registers with the drain port upon movement of the plunger in the pressure decreasing direction, and wherein a spring pressed closure is provided for the first said opening.

21. A clutch mechanism for a helicopter as set forth in claim 20, wherein means is provided for limiting movement of the plunger in the pressure decreasing direction at the position where the second said opening registers with the drain port, and wherein the spring pressed closure is carried by a plug within the plunger and normally engaged by the plunger moving means, the said plug being movable in the pressure decreasing direction additionally to the plunger when the plunger engages the said movement limiting means and the said plug upon such additional movement moving the closure from its closing position.

22. In a clutch mechanism for a helicopter, the combination of a driving member and a normally driven member and an intermediate member all rotatable about the same axis and in the same direction, a friction clutch concentric with the intermediate member and the driven member serving upon the application or release of pressure to establish or break a power connection between them, a hydraulic system including a normally closed annular oil chamber and a longitudinally movable annular piston engageable with the clutch, a plurality of circumaxially spaced plungers longitudinally movable in opposite directions for increasing or decreasing oil pressure in the annular chamber to cause the piston to apply or release pressure on the clutch, means for transmitting power from the driving member to the intermediate member, a clutch controlling member associated with the said power transmitting means for simultaneously moving all of the said plungers in one direction to increase the oil pressure in the oil chamber when power is transmitted from the driving member to the intermediate member which clutch controlling member permits movement of all of the said plungers in the opposite direction to decrease oil pressure in the annular oil chamber when the said driven member is rotated by external force and momentarily rotates the intermediate member at a speed higher than that of the driving member, means including a port for draining oil from the said annular oil chamber, and means serving to close the said oil drain port upon movement of one of the said plungers in the pressure increasing direction and serving to open the said oil drain port upon movement of the said plunger in the pressure decreasing direction.

23. In a clutch mechanism for a helicopter, the combination of a normally rotating driving member, a rotatable normally driven member, a rotatable intermediate member, a clutch serving upon the application or release of pressure to establish or break a power connection between the intermediate member and the driven member, hydraulic means including an oil chamber and a piston for applying pressure to the clutch and for releasing pressure thereon, means having at least two plunger chambers communicating with the said oil chamber, at least two plungers fitting corresponding plunger chambers and movable therein, means for transmitting power from the driving member to the intermediate member, means associated with the said power transmitting means for moving the said plungers in one direction to increase the oil pressure in the oil chamber when power is transmitted from the driving member to the intermediate member which means permits movement of the plungers in the opposite direction to decrease oil pressure in the oil chamber when the said driven member is rotated by external force and momentarily rotates the intermediate member at a speed higher than the speed corresponding to that of the driving member, means including a port for supplying oil under pressure to the said oil chamber, means serving to open the said oil supply port upon movement of one plunger in the pressure increasing direction and serving to close the said oil supply port upon movement of the said plunger in the pressure decreasing direction, means including a port for draining oil from the oil chamber, and means serving to close the said oil drain port upon movement of another plunger in the pressure increasing direction and serving to open the said oil drain port upon movement of the last said plunger in the pressure decreasing direction.

24. A clutch mechanism for a helicopter as set forth in claim 23, wherein the supply port and the drain port are relatively positioned to cause the closing of the drain port prior to the opening of the supply port when the plungers are moved in the pressure increasing direction and to cause the closing of the supply port prior to the opening of the drain port when the plungers are moved in the pressure decreasing direction.

25. In a clutch mechanism for a helicopter, the combination of a driving member and a normally driven member and an intermediate member all rotatable about the same axis and in the same direction, a friction clutch concentric with the intermediate member and the driven member serving upon the application or release of pressure to establish or break a power connection between the intermediate member and the driven member, a hydraulic system including a normally closed annular oil chamber and a longitudinally movable annular piston engageable with the clutch, a plurality of circumaxially spaced plungers longitudinally movable in opposite directions for increasing or decreasing oil pressure in the annular chamber to cause the piston to apply or release pressure on the clutch, means for transmitting power from the driving member to the intermediate member, means associated with the said power transmitting means for simultaneously moving all of the said plungers in one direction to increase the oil pressure in the oil chamber when power is transmitted from the driving member to the intermediate member which means permits movement of all of the said plungers in the opposite direction to decrease oil pressure in the annular oil chamber when the said driven member is rotated by external force and momentarily rotates the intermediate member at a speed higher than that of the driving member, means including a port for supplying oil under pressure to the said annular oil chamber, means serving to open the said oil supply port upon movement of one of the said plungers in the pressure increasing direction and serving to close the said oil supply port upon movement of the said plunger in the pressure decreasing direction, means including a port for draining oil from the said annular oil chamber, and means serving to close the said drain port upon the movement of another plunger in the pressure increasing direction and serving to open the said oil drain port upon movement of the last said plunger in the pressure decreasing direction.

26. A clutch mechanism for a helicopter as set forth in claim 25, wherein the intermediate member is provided with a low pressure oil reservoir and a high pressure oil reservoir, wherein means is provided for withdrawing oil from the low pressure oil reservoir and delivering it to the high pressure oil reservoir, wherein the said oil supply port receives oil from the high pressure oil reservoir, and wherein the said drain port discharges into the said low pressure oil reservoir.

27. In a clutch mechanism for a helicopter, the combination of a driving member and a normally driven member and an intermediate member all rotatable about the same axis and in the same direction, the said intermediate member including a housing provided with a main annular oil reservoir within which an annular layer of oil is rotated, a friction clutch within the housing of the intermediate member and serving upon the application of pressure thereto to transmit power between the said intermediate and driven members, hydraulic means on the intermediate member and within the housing thereof which means includes a piston chamber and a relatively movable piston for applying pressure to the clutch, a stationary oil intake pipe located within the housing of the intermediate member and having an intake opening positioned in said annular layer of oil and facing in the direction to receive oil therefrom, means within the housing of the intermediate member and including ducts carried by the said member for transmitting oil from the said stationary intake pipe to the said piston chamber of the hydraulic means, means for transmitting power from the driving member to the intermediate member, and means dependent on the torque in the power transmitting means for controlling the pressure of oil in the said piston chamber.

28. In a clutch mechanism for a helicopter, the combination of a driving member and a normally driven member and an intermediate member all rotatable about the same axis and in the same direction, the said intermediate member including a housing having a transverse partition therein with two chambers at opposite sides thereof one of which chambers constitutes an annular oil reservoir within which an annular layer of oil is rotated, a friction clutch located within the other said chamber and serving upon the application of pressure thereto to transmit power between the said members, hydraulic means carried by the said transverse partition which means includes a piston chamber and a relatively movable piston for applying pressure to the clutch, a stationary oil intake pipe located within the first said chamber and having an intake opening positioned in said annular layer of oil and facing in the direction to receive oil therefrom, means within the housing of the intermediate member and including ducts within the said partition for transmitting oil from the said stationary intake pipe to the said piston chamber of the hydraulic means, means for transmitting power from the driving member to the intermediate member, and means dependent on the torque in the power transmitting means for controlling the pressure of oil in the said piston chamber.

29. In a clutch mechanism for a helicopter, the combination of a driving member and a normally driven member and an intermediate member all rotatable about the same axis and in the same direction, the said intermediate member being provided with an oil reservoir, a friction clutch concentric with the intermediate and driven members and serving upon the application of pressure thereto to transmit power between the said members, hydraulic means on the intermediate member including a piston chamber and a relatively movable piston for applying pressure to the clutch, means on the intermediate member including a duct for supplying oil from the reservoir to the piston chamber, a pump carried by the intermediate member and bodily rotatable about the said axis which pump serves to supply oil under pressure to the said reservoir, means for operating the pump, means for transmitting power from the driving member to the intermediate member, and means dependent on the torque in the power transmitting means for controlling the flow of oil through the said duct.

30. In a clutch mechanism for a helicopter, the combination of a driving member and a normally driven member and an intermediate member all rotatable about the same axis and in the same direction, the said intermediate member being provided with an annular oil reservoir, a friction clutch concentric with the intermediate and driven members and serving upon the application of pressure thereto to transmit power between the said members, hydraulic means on the intermediate member including an annular piston chamber and a longitudinally movable annular piston for applying pressure to the clutch, means on the intermediate member including a duct for supplying oil from the annular reservoir to the annular piston chamber, a plurality of similar circumaxially spaced pumps carried by the intermediate member and bodily rotatable about the said axis which pumps serve to supply oil under pressure to the said annular reservoir, means for operating the pumps, means for transmitting power from the driving member to the intermediate member, and means dependent on the torque in the power transmitting means for controlling the flow of oil through the said duct.

31. In a clutch mechanism for a helicopter, the combination of a driving member and a normally driven member and an intermediate member all rotatable about the same axis and in the same direction, the said intermediate member being provided with an annular oil reservoir, a friction clutch concentric with the intermediate and driven members and serving upon the application of pressure thereto to transmit power between the said members, hydraulic means on the intermediate member including an annular piston chamber and a longitudinally movable annular piston for applying pressure to the clutch, means on the intermediate member including a duct for supplying oil from the annular reservoir to the annular piston chamber, a plurality of similar circumaxially spaced pumps carried by the intermediate member and bodily rotatable about the said axis which pumps serve to supply oil under pressure to the said reservoir, each of the said pumps comprising longitudinally movable pistons and piston extensions spring pressed for movement in one direction, rotatable shoes respectively engaging the piston extensions, a nonrotatable inclined abutment plate engaging the several rotatable shoes to cause them to cooperate with the springs for reciprocating the pistons, means for transmitting power from the driving member to the intermediate member, and means dependent on the torque in the power transmitting means for controlling the flow of oil through the said duct.

32. In a clutch mechanism for a helicopter, the combination of a driving member and a normally driven member and an intermediate member all rotatable about the same axis and in the same direction, the said intermediate member including a housing which constitutes an annular main oil reservoir and the said intermediate member having a secondary oil reservoir, a friction clutch concentric with the intermediate and driven members and serving upon the application of pressure thereto to transmit power between the said members, hydraulic means on the intermediate member including a piston chamber and a relatively movable piston for applying pressure to the clutch, means on the intermediate member including a duct for supplying oil from the secondary oil reservoir to the chamber, a pump carried by the intermediate member and bodily rotatable about the said axis which pump serves to withdraw oil from the annular main oil reservoir and to deliver it under pressure to the said secondary oil reservoir, means for operating the pump, means for transmitting power from the driving member to the intermediate member, and means dependent on the torque in the power transmitting means for controlling the flow of oil through the said duct.

33. In a clutch mechanism for a helicopter, the combination of a driving member and a normally driven member and an intermediate member all rotatable about the same axis and in the same direction, the said intermediate member including a housing which constitutes an annular main oil reservoir within which an annular layer of oil is rotated and the said intermediate member having a secondary oil reservoir, a friction clutch concentric with the intermediate and driven members and serving upon the application of pressure thereto to transmit power between the said members, hydraulic means on the intermediate member including a piston chamber and a relatively movable piston for applying pressure to the clutch, means on the intermediate member including a duct for supplying oil from the secondary oil reservoir to the piston chamber, a pump carried by the intermediate member and bodily rotatable about the said axis which pump serves to deliver oil under pressure to the said secondary oil reservoir, means for operating the pump, means including a duct for supplying oil to the pump, a stationary oil intake pipe communicating with the last said duct and having an intake opening positioned in said annular layer of oil in the main oil reservoir and facing in the direction to receive oil therefrom, means for transmitting power from the driving member to the intermediate member, and means dependent on the torque in the power transmitting means for controlling the flow of oil through the said duct from the main oil reservoir to the piston chamber.

34. In a clutch mechanism for a helicopter, the combination of a driving member and a normally driven member and an intermediate member all rotatable about the same axis and in the same direction, the said intermediate member being provided with an oil reservoir, a friction clutch serving upon the application or release of pressure to establish or break a power connection between the intermediate member and the driven member, hydraulic means on the intermediate member for applying pressure to the clutch and for releasing pressure thereon which means includes an oil supply duct connected with the said reservoir, lubricating means for the clutch mechanism including a lubricating supply duct connected with the said reservoir, means for transmitting power from the driving member to the intermediate member, means associated with the said power transmitting means for controlling the flow of oil through the first said duct to cause the application of pressure to the clutch when power is transmitted from the driving member to the intermediate member and to cause the release of the said pressure when the said driven member is rotated by external force and momentarily rotates the intermediate member at a speed higher than that of the driving member, two pumps carried by the intermediate member and bodily rotatable about the said axis each of which pumps serves to supply oil under pressure to the said reservoir, means dependent upon the rotation of the intermediate member for operating one of the said pumps, and means dependent upon rotation of the driven member relatively to the said intermediate member for operating the second said pump.

35. A clutch mechanism for a helicopter as set forth in claim 34, wherein the intermediate member has a longitudinal pump chamber, wherein the first pump mechanism includes a spring pressed piston longitudinally movable in the said pump chamber and also includes an inclined nonrotatable abutment plate and further includes a shoe in fixed rotative relationship with the intermediate member and connected with the piston which shoe engages the abutment plate, and wherein the second pump mechanism includes a second spring pressed piston longitudinally movable in the said pump chamber and also includes an inclined abutment plate rotatable with the normally driven member and further includes a second shoe in fixed rotative relationship with the intermediate member and connected with the second piston which second said shoe engages the second said abutment plate.

36. In a clutch mechanism for a helicopter, the combination of a driving member and a normally driven member and an intermediate member all rotatable about the same axis and in the same direction, the said intermediate member being provided with an oil reservoir, a friction clutch serving upon the application or release of pressure to establish or break a power connection between the intermediate member and the driven member, hydraulic means on the intermediate member for applying pressure to the clutch and for releasing pressure thereon which means includes an oil supply duct connected with the said reservoir, means for transmitting power from the driving member to the intermediate member, means associated with the said power transmitting means for controlling the flow of oil through the said duct to cause the application of pressure to the clutch when power is transmitted from the driving member to the intermediate member and to cause the release of the said pressure when the said driven member is rotated by external force and momentarily rotates the intermediate member at a speed higher than that of the driving member, means for supplying oil under pressure to the said reservoir, and a relief valve carried by the intermediate member and connected with the said oil reservoir for limiting the pressure therein.

37. A clutch mechanism for a helicopter as set forth in claim 36, wherein the relief valve is constructed and arranged to act centrifugally to increase and decrease the limit of pressure in the said reservoir in accordance with increases and decreases in the speed of rotation of the intermediate member.

38. A clutch mechanism for a helicopter as set forth in claim 36, wherein the relief valve is spring pressed to an open position when the intermediate member is idle or is rotating at a speed below a predetermined critical speed and is moved centrifugally toward a closed position in accordance with increases in the speed of rotation of the intermediate member above the said critical speed.

39. In a clutch mechanism for a helicopter, the combination of a driving member and a normally driven member and an intermediate member all rotatable about the same axis and in the same direction, the said intermediate member being provided with an oil reservoir, means for supplying oil under pressure to the said reservoir, means for transmitting power from the driving member to the intermediate member, a friction clutch serving upon the application of pressure to establish a power connection between the intermediate member and the driven member, hydraulic means located on the intermediate member and operatively interposed between the said power transmitting means and the said clutch which means includes a piston chamber and a piston for applying pressure to the clutch and which means also includes an oil supply duct connecting the said piston chamber with the said reservoir, means connected with the said power transmitting means for controlling the flow of oil to the piston chamber through the said duct to cause the piston to apply pressure to the clutch when power is transmitted from the driving member to the intermediate member, and a manually controlled by-pass valve connected with the said piston chamber independently of said oil supply duct which valve when open prevents the said establishment of pressure in the said chamber and thereby prevents the piston from applying pressure to the clutch and which valve when closed enables the establishment of pressure in the said chamber and thereby causes the said piston to apply pressure to the clutch.

40. In a clutch mechanism for a helicopter, the combination of a driving member and a normally driven member and an intermediate member all rotatable about the same axis and in the same direction, a friction clutch serving upon the application of pressure to establish a power connection between the intermediate member and the driven member, a hydraulic system on the intermediate member for applying pressure to the clutch, means for supplying oil under pressure to the said hydraulic system, means for transmitting power from the driving member to the intermediate member, means dependent upon the transmission of power by the last said means for normally causing the hydraulic system to apply pressure to the clutch, a spring pressed relief valve connected with the said hydraulic system and having an open position when the intermediate member is idle or is rotating at a speed below a predetermined critical speed, the said valve in its open position preventing the said hydraulic system from applying pressure to the clutch and the said valve being centrifugally movable toward a closed position in accordance with increases in the speed of rotation of the intermediate member above the said critical speed so as to cause the hydraulic system to apply pressure to the clutch, and a manually controlled by-pass valve connected with the said hydraulic system which valve when open prevents the said hydraulic system from applying pressure to the clutch and which valve when closed enables the said hydraulic system to apply pressure to the clutch.

41. In a clutch mechanism for a helicopter, the combination of a driving member and a normally driven member and an intermediate member all rotatable about the same axis and in the same direction, the said intermediate member being provided with an oil reservoir, a friction clutch serving upon the application or release of pressure to establish or break a power connection between the intermediate member and the driven member, hydraulic means on the intermediate member for applying pressure to the clutch and for releasing pressure thereon which means includes an oil supply duct connected with the said reservoir, means for transmitting power from the driving member to the intermediate member, means dependent upon the transmission of power by the last said means for controlling the flow of oil through the said duct to cause the application of pressure to the clutch, means for supplying oil under pressure to the said oil reservoir, lubricating means for the clutch mechanism including a lubricating supply duct connected with the said oil reservoir, and a flow control valve carried by the intermediate member and serving to control the supply of oil to the lubricating duct.

References Cited in the file of this patent

UNITED STATES PATENTS 2,210,416     Kiep et al. _____ Aug. 6, 1940

(Other references on following page)

UNITED STATES PATENTS

| | | |
|---|---|---|
| 2,428,128 | Sheppard | Sept. 30, 1947 |
| 2,495,988 | Sheppard | Jan. 31, 1950 |
| 2,530,904 | Ofeldt | Nov. 21, 1950 |
| 2,587,823 | De Pew | Mar. 4, 1952 |
| 2,620,814 | Hobbs | Dec. 9, 1952 |
| 2,644,535 | Koup et al. | July 7, 1953 |
| 2,646,150 | Hobbs | July 21, 1953 |
| 2,695,693 | Cartlidge | Nov. 3, 1954 |

FOREIGN PATENTS

| | | |
|---|---|---|
| 250,309 | Great Britain | Apr. 7, 1926 |
| 390,420 | Great Britain | Apr. 6, 1933 |
| 689,694 | Great Britain | Apr. 1, 1953 |